US010864683B2

(12) United States Patent
Tsurugai et al.

(10) Patent No.: US 10,864,683 B2
(45) Date of Patent: Dec. 15, 2020

(54) THERMAL CAULKING METHOD, THERMAL CAULKING DEVICE, AND CAULKED MATERIAL

(71) Applicant: HONDA MOTOR CO., LTD., Tokyo (JP)

(72) Inventors: Yoshinori Tsurugai, Tochigi (JP); Hiroshi Ishikawa, Tochigi (JP); Shigeto Akahori, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 15/760,415

(22) PCT Filed: Sep. 16, 2016

(86) PCT No.: PCT/JP2016/077541
§ 371 (c)(1),
(2) Date: Mar. 15, 2018

(87) PCT Pub. No.: WO2017/047786
PCT Pub. Date: Mar. 23, 2017

(65) Prior Publication Data
US 2019/0084248 A1    Mar. 21, 2019

(30) Foreign Application Priority Data

Sep. 18, 2015    (JP) .................................. 2015-185217

(51) Int. Cl.
*B29C 65/60* (2006.01)
*B29C 65/00* (2006.01)
(Continued)

(52) U.S. Cl.
CPC ............ *B29C 65/606* (2013.01); *B29C 65/18* (2013.01); *B29C 65/224* (2013.01);
(Continued)

(58) Field of Classification Search
CPC ......... B29C 65/02; B29C 65/18; B29C 65/24; B29C 65/30; B29C 65/56; B29C 65/60;
(Continued)

(56) References Cited

U.S. PATENT DOCUMENTS 8,455,067 B2 * 6/2013 Maier ................. B29C 65/3428
428/34.1
10,294,955 B2 * 5/2019 Learn .................... F04D 29/023
(Continued)

FOREIGN PATENT DOCUMENTS

CN    1836820 A    9/2006
JP    7-117134    5/1995
(Continued)

OTHER PUBLICATIONS

Machine Translation of JP 2008-132682A, Retrieved from ESPACENET on Jan. 5, 2020 (Year: 2008).*
(Continued)

*Primary Examiner* — J. Todd Newton
*Assistant Examiner* — Sang K Kim
(74) *Attorney, Agent, or Firm* — Rankin, Hill & Clark LLP (57) ABSTRACT

Provided is a thermal caulking method of melting, at one time, a plurality of bosses 33 of a second member 30 protruding toward an inner circumferential surface of a conical hollow portion 11 of a first member 10 while being fitted to a plurality of holes 132 provided in the inner circumferential surface of the hollow portion 11 of the first member 10 having the substantially conical hollow portion 11 so that the plurality of bosses are joined to the first member 10, in which the plurality of bosses 33 are melted at one time by using a heat chip 51 having a continuous
(Continued)

shape in the circumferential direction of the hollow portion 11 along the inner circumferential surface and are joined to the first member 10 while the adjacent melted bosses 33 are connected to each other.

4 Claims, 7 Drawing Sheets

(51) Int. Cl.
  *B29C 65/18* (2006.01)
  *B29C 65/22* (2006.01)
  *B29C 65/30* (2006.01)
  *F01D 9/02* (2006.01)
  *B29L 31/08* (2006.01)

(52) U.S. Cl.
  CPC .......... *B29C 65/226* (2013.01); *B29C 65/228* (2013.01); *B29C 65/30* (2013.01); *B29C 66/322* (2013.01); *B29C 66/3242* (2013.01); *B29C 66/532* (2013.01); *B29C 66/545* (2013.01); *B29C 66/612* (2013.01); *B29C 66/73921* (2013.01); *B29C 66/81422* (2013.01); *B29C 66/8322* (2013.01); *B29C 66/843* (2013.01); *F01D 9/02* (2013.01); *B29C 66/71* (2013.01); *B29C 66/81415* (2013.01); *B29L 2031/08* (2013.01); *F05D 2230/232* (2013.01); *F05D 2230/60* (2013.01); *F05D 2240/12* (2013.01)

(58) Field of Classification Search
  CPC ..... B29C 65/606; B29C 65/72; B29C 66/301; B29C 66/303; B29C 66/30321; B29C 66/5221; B29C 66/612; F04D 29/023; F04D 29/026; F04D 29/08; F04D 29/2261; F04D 29/284; F04D 29/2222; F04D 29/4226; F04D 29/4233
  See application file for complete search history.

(56) References Cited

U.S. PATENT DOCUMENTS

| | | | |
|---|---|---|---|
| 10,369,749 B2* | 8/2019 | Tsurugai | B29C 66/73921 |
| 2016/0341210 A1* | 11/2016 | Ishikawa | F04D 29/2227 |
| 2017/0203499 A1* | 7/2017 | Tsubone | B29C 65/30 |
| 2017/0321705 A1* | 11/2017 | Leal | F04D 17/165 |

FOREIGN PATENT DOCUMENTS

| | | | | |
|---|---|---|---|---|
| JP | 9-019965 | | 1/1997 | |
| JP | 3899355 | | 3/2007 | |
| JP | 2007-307812 | | 11/2007 | |
| JP | 3161142 | | 7/2010 | |
| JP | 20080132682 A | * | 6/2012 | ........... B29C 65/607 |

OTHER PUBLICATIONS

Nippon Avionics Co., Ltd., Heater Tip/Heater Tool, Retrieved from Wayback Machine on Jan. 5, 2020 (Year: 2016).*
Chinese Office Action dated May 6, 2020, 5 pages.

* cited by examiner

THERMAL CAULKING METHOD, THERMAL CAULKING DEVICE, AND CAULKED MATERIAL

TECHNICAL FIELD

The present invention relates to a thermal caulking method and a thermal caulking device for melting a plurality of bosses at one time and performing thermal caulking thereon and a caulked material obtained from the method and the device.

BACKGROUND ART

Conventionally, a thermal caulking method has been known in which a first member to be thermally caulked is inclined so that a welding chip is accessible to a portion of the first member to be thermally caulked (for example, Patent Document 1). Further, a thermal caulking device having two melting chips has been known from the past (for example, Patent Document 2). Two melting chips are pressed against a plurality of welding bosses so that the plurality of welding bosses are melted. Further, a heat chip having a front end surface with a large contact area capable of welding a plurality of positions has been known (for example, Patent Document 3).

Patent Document 1: Japanese Utility Model Publication No. 3161142
Patent Document 2: Japanese Patent No. 3899355
Patent Document 3: Japanese Unexamined Patent Application, Publication No. 2007-307812

DISCLOSURE OF THE INVENTION

Problems to be Solved by the Invention

In the thermal caulking method described in Patent Document 1, when the welding chip acts on the resinous welding boss in an inclined state, the resin forming the welding boss cannot be uniformly melted and thus the welding strength can be easily non-uniform. For this reason, the same publication describes a technique for performing thermal caulking using a crank-shaped chip.

Further, in the thermal caulking device described in Patent Document 2, a temperature or melted state for each position to be melted by the melting chip becomes different and thus a uniform temperature or a uniform melted state cannot be easily managed on the whole. Further, since a melted portion formed by the melting of the heat chip is widened when using the chip described in Patent Document 3, it is difficult to obtain stable bonding strength by welding.

Thus, when the second member is welded to the first member at a plurality of portions, it is difficult to obtain high welding strength by uniformly welding the plurality of portions of the second member to an inclined portion of the first member at one time.

An object of the invention is to provide a thermal caulking method and a thermal caulking device capable of performing thermal caulking stably obtaining high bonding strength with welding by welding a plurality of portions of a second member to a first member inclined with respect to a vertical direction at one time and a caulked material obtained by the method and device.

Means for Solving the Problems

In order to achieve the above-described object, the invention provides a thermal caulking method of melting, at one time, a plurality of bosses (for example, bosses 33 to be described later) of a second member (for example, a blade member 30 to be described later) protruding toward an inner circumferential surface of a conical hollow portion of a first member while being fitted to a plurality of holes (for example, joining holes 132 to be described later) provided in the inner circumferential surface of the hollow portion of the first member (for example, a main plate 10 to be described later) having the substantially conical hollow portion (for example, a hollow portion 11 to be described later) so that the plurality of bosses are joined to the first member, wherein the plurality of bosses are melted at one time by using a heat chip (for example, a heat chip 51 to be described later) having a continuous shape in a circumferential direction of the hollow portion along the inner circumferential surface and are joined to the first member while the melted adjacent bosses are connected to each other.

According to the invention, the adjacent bosses among the plurality of bosses protruding from the inner circumferential surface inclined with respect to the vertical direction can be melted and connected to each other by the outer circumferential surface of the heat chip formed by a continuous surface having a continuous shape. For this reason, since it is possible to improve the joining strength, it is possible to prevent the second member having the boss from falling off from the hole. Further, since it is possible to melt the plurality of bosses at a uniform temperature and a uniform pressure at one time, it is possible to obtain uniform joining strength.

Further, the invention provides a thermal caulking device (for example, a thermal caulking device 50 to be described later) for melting, at one time, a plurality of bosses (for example, bosses 33 to be described later) of a second member (for example, a blade member 30 to be described later) protruding toward an inner circumferential surface of a conical hollow portion of a first member while being fitted to a plurality of holes (for example, joining holes 132 to be described later) provided in the inner circumferential surface of the hollow portion of the first member (for example, a main plate 10 to be described later) having the substantially conical hollow portion (for example, a hollow portion 11 to be described later) so that the plurality of bosses are joined to the first member, the thermal caulking device including: a heat chip (for example, a heat chip 51 to be described later) having a continuous shape in a circumferential direction of the hollow portion along the inner circumferential surface.

According to the invention, since the outer circumferential surface of the heat chip is formed by a continuous surface having a continuous shape, it is possible to melt and connect the adjacent bosses among the plurality of bosses protruding from the inner circumferential surface inclined with respect to the vertical direction. For this reason, since it is possible to improve the joining strength, it is possible to prevent the second member having the boss from falling off from the hole. Further, since it is possible to melt the plurality of bosses at a uniform temperature and a uniform pressure at one time, it is possible to obtain uniform joining strength.

Further, since the heat chip has a continuous shape in the circumferential direction of the hollow portion, it is possible to obtain a uniform pressure applied to the melting point of the boss in the plurality of bosses arranged on the inclined surface such as the inner circumferential surface of the substantially conical hollow portion and thus to reliably press the plurality of bosses. As a result, it is possible to thermally caulk the plurality of bosses disposed on the inclined surface at the same time.

Then, an upper end portion of the heat chip is provided with a convex stepped portion (for example, a stepped portion 517 to be described later) which prevents the melted portion (for example, a melted portion 33A to be described later) formed by melting the boss from flowing toward above the heat chip and is formed to be continuous in the circumferential direction of the upper end portion of the heat chip.

For this reason, it is possible to suppress the melted portion formed by melting the boss from flowing toward above the heat chip and to store the melted portion between the outer circumferential surface of the heating portion of the heat chip and the inner circumferential surface of the main plate. Accordingly, since it is possible to secure a sufficient amount of the melted portion for connecting the adjacent bosses, it is possible to reliably maintain the joining strength.

Further, the invention provides a caulked material (for example, an impeller 1 to be described later) including: a first member (for example, a main plate 10 to be described later) having a substantially conical hollow portion (for example, a hollow portion 11 to be described later); and a plurality of bosses (for example, bosses 33 to be described later) of a second member (for example, a blade member 30 to be described later) protruding toward an inner circumferential surface of the hollow portion of the first member while being fitted to a plurality of holes (for example, joining holes 132 to be described later) provided in the inner circumferential surface of the hollow portion of the first member and melted at one time to be joined to the first member, wherein melted portions (for example, melted portions 33A to be described later) formed by melting the plurality of bosses are connected to each other.

According to the invention, since the melted portions formed by melting the adjacent bosses are connected to each other, it is possible to obtain uniform joining strength of the second member with respect to the first member on the whole. Further, since it is possible to improve the joining strength of the second member with respect to the first member, it is possible to prevent the second member having the boss from falling off from the hole.

Then, a partition wall (for example, a partition wall 134 to be described later) for stopping the melted portion is formed at a portion of the first member corresponding to a lower end portion of the melted portion of the inner circumferential surface of the hollow portion of the first member before the second member is joined to the first member.

For this reason, since the inner circumferential surface constituting the hollow portion of the first member has a substantially conical shape, the melted boss is about to flow downward. However, since a portion of the first member corresponding to the lower end of the melted portion is provided with the partition wall for stopping the flow of the melted portion, the melted portion does not flow downward beyond the partition wall and stays in a portion of the partition wall. Then, since there is a sufficient amount of the melted portion for connecting the adjacent bosses, the strength is maintained. Further, when the heat chip is inserted to the lower end, the partition wall is also melted. Accordingly, the amount of the melted portion increases and thus a connection portion with higher strength can be formed. Further, in a case in which the partition wall extends toward above the first member at the time of performing thermal caulking, when the partition wall is melted, the melted partition wall can flow to the melted portion formed by melting the boss while not flowing downward.

Then, the first member is formed by a main plate (for example, a main plate 10 to be described later), the second member is formed by a plurality of blade members (for example, blade members 30 to be described later), and the caulked material is an impeller (for example, an impeller 1 to be described later) including the first member and the second member.

For this reason, it is possible to easily manufacture the impeller in which the blade members are disposed to overlap each other when the impeller is viewed from the rotation axis direction of the impeller by thermal caulking.

Effects of the Invention

According to the invention, it is possible to provide a thermal caulking method and a thermal caulking device capable of performing thermal caulking stably obtaining high bonding strength with joining by joining a plurality of portions of a second member to a first member inclined with respect to a vertical direction at one time and a caulked material obtained by the method and device.

PREFERRED MODE FOR CARRYING OUT THE INVENTION

Figure 1:
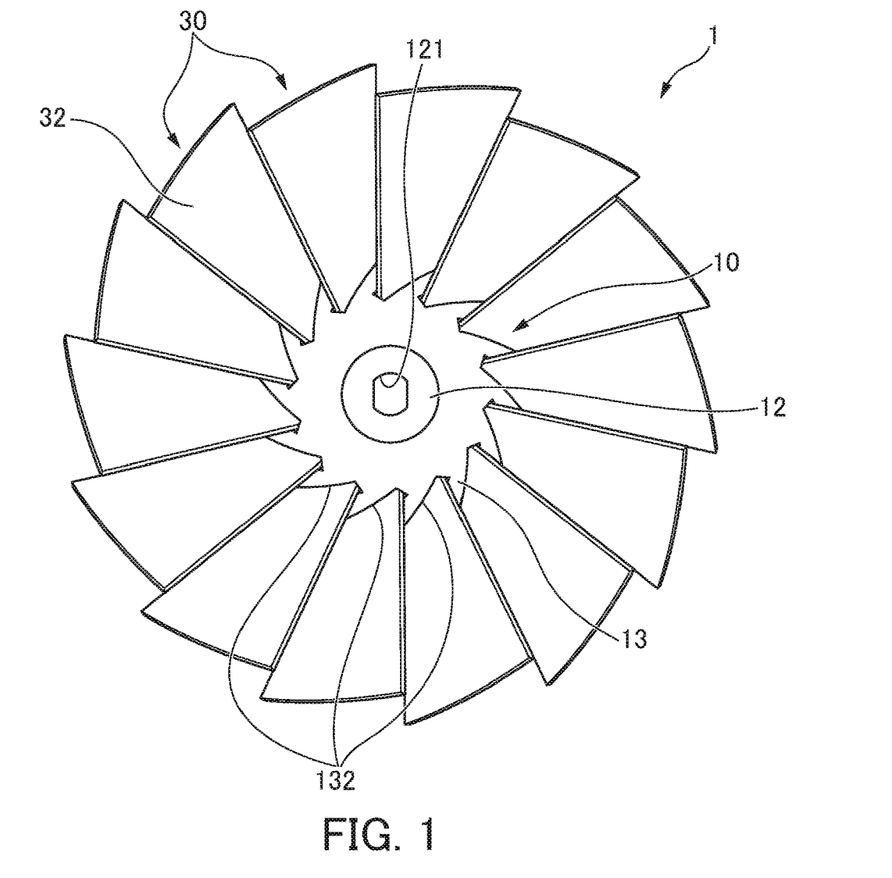
FIG. 1 is a plan view illustrating an impeller 1 which is a caulked material according to a first embodiment of the invention.
Figure 2:
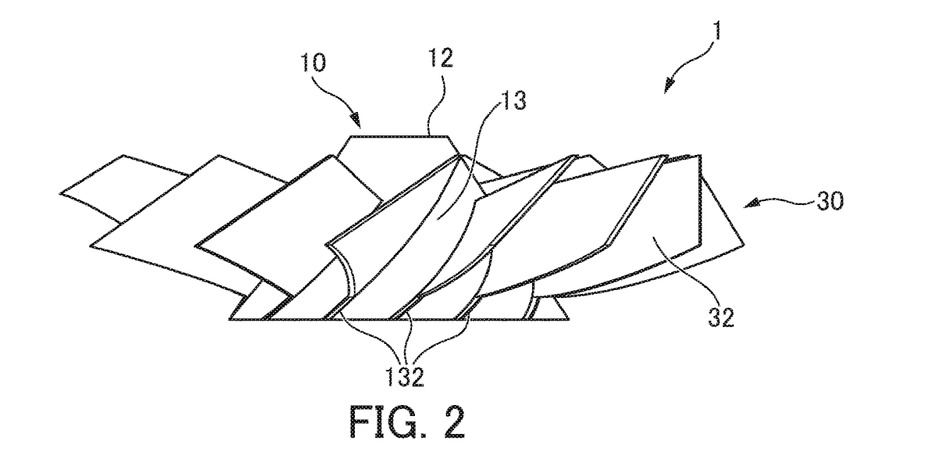
FIG. 2 is a side view illustrating the impeller 1 which is the caulked material according to the first embodiment of the invention.
Figure 3:
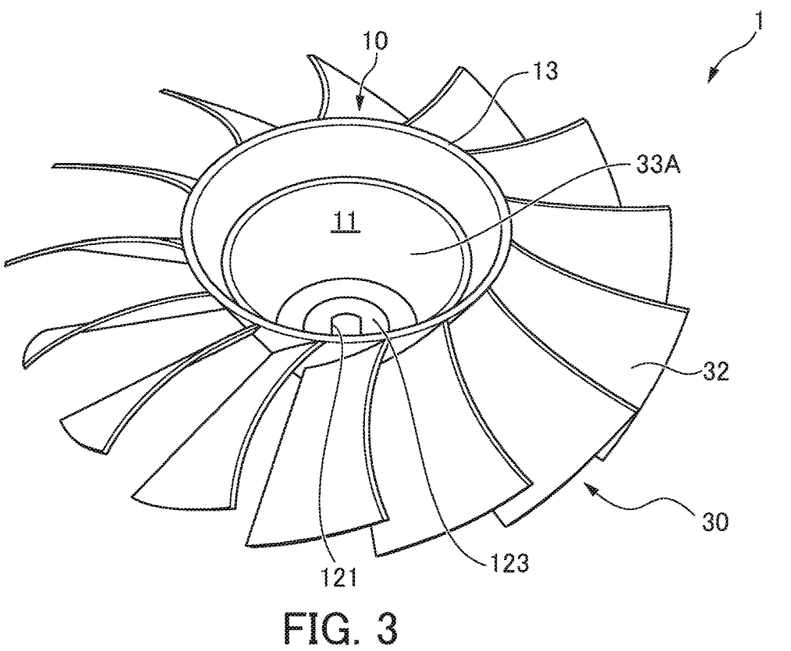
FIG. 3 is a bottom perspective view illustrating the impeller 1 which is the caulked material according to the first embodiment of the invention.
Figure 4:
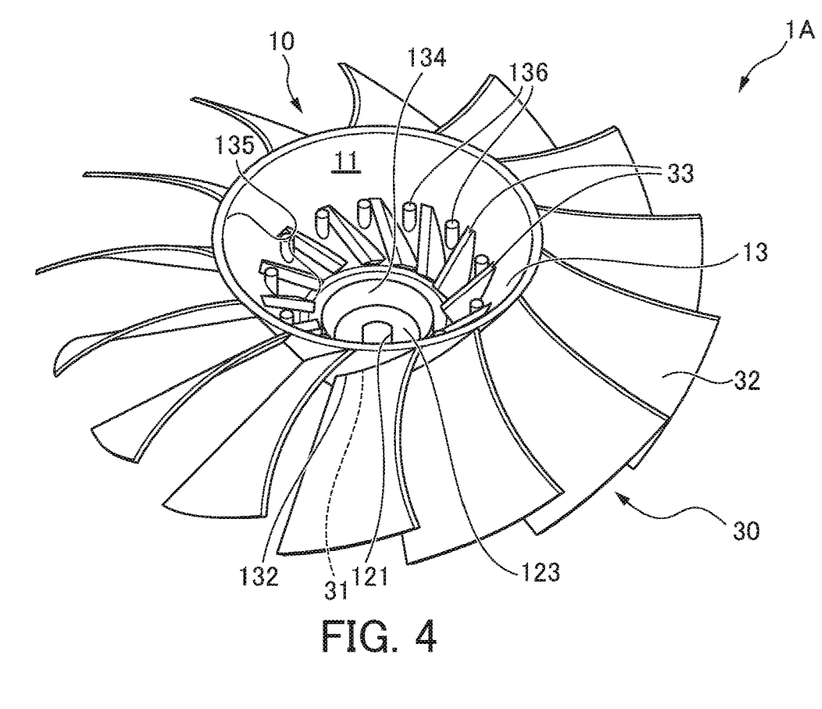
FIG. 4 is a bottom perspective view illustrating a non-caulked material 1A to be thermally caulked by a thermal caulking method according to the first embodiment of the invention.
Figure 5:
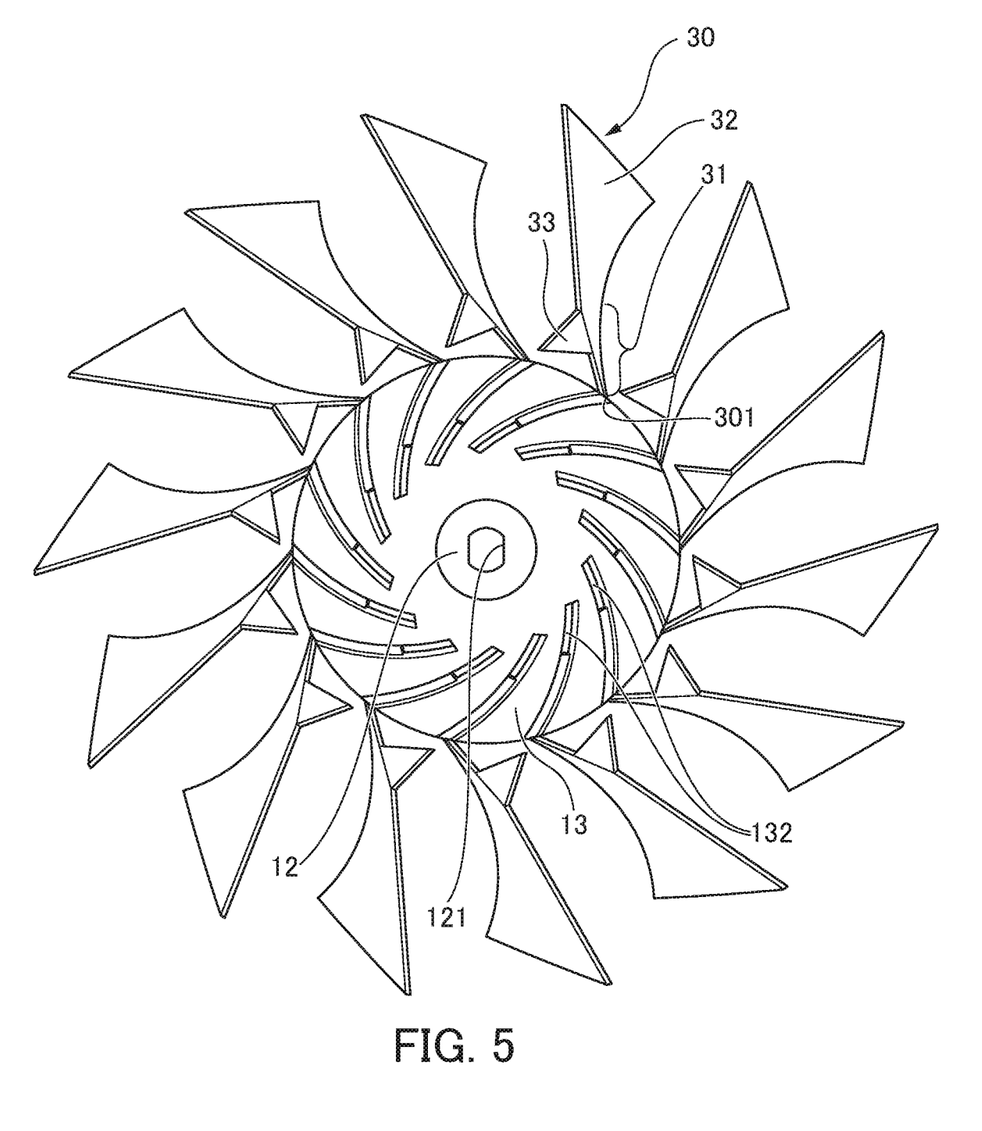
FIG. 5 is a plan view illustrating a state before the non-caulked material 1A according to the first embodiment of the invention is assembled.

A first embodiment of the invention will be described in detail with reference to the drawings. First, a caulked material will be described. FIG. 1 is a plan view illustrating an impeller 1 which is a caulked material according to the first embodiment of the invention. FIG. 2 is a side view illustrating the impeller 1 which is the caulked material according to the first embodiment of the invention. FIG. 3 is a bottom perspective view illustrating the impeller 1 which is the caulked material according to the first embodiment of the invention. FIG. 4 is a bottom perspective view illustrating a non-caulked material 1A to be thermally caulked by a thermal caulking method according to the first embodiment of the invention. FIG. 5 is a plan view illustrating a state before the non-caulked material 1A according to the first embodiment of the invention is assembled.

In the following description, for convenience of description, in the impeller 1 which is the caulked material and the non-caulked material 1A to be described later, as illustrated in FIG. 2, a direction from a lower base to an upper base of a main plate 10 having an isosceles trapezoidal shape in the side view (the upward direction in FIG. 2) is defined as the upward direction and the opposite direction is defined as the downward direction. Further, in a heat chip 51 to be described later, on the contrary to the impeller 1, a direction from the upper base to the lower base (the upward direction in FIG. 7) of the main plate 10 having an isosceles trapezoid shape in the side view is defined as the upward direction and the opposite direction is defined as the downward direction.

As illustrated in FIG. 1, the caulked material is specifically the impeller 1 used for blowing air in a fan or the like. The impeller 1 includes a first member and a second member formed of resin which is polypropylene (PP). The first member includes, as illustrated in FIG. 2, the main plate 10 of which an outer shape is a truncated conical shape. The inside of the main plate 10 is hollow and thus the main plate 10 includes a substantially conical hollow portion 11 (see FIG. 3). The upper end portion of the main plate 10 is blocked by an upper plate 12 and the upper plate 12 is provided with an attachment hole 121 which is formed by a penetration hole into which a rotation shaft extending from a driving source is inserted.

A side plate 13 of the main plate 10 is provided with a plurality of joining holes 132. The joining hole 132 extends, as illustrated in FIG. 5 and the like, from the substantially center position of the side plate 13 of the main plate 10 in the axial direction of the main plate 10 toward the lower side of the side plate 13 of the main plate 10 and extends to the vicinity of the lower end portion of the side plate 13 of the main plate 10 obliquely in the circumferential direction of the side plate 13 of the main plate 10. The upper portion of the joining hole 132 is formed by a penetration hole. The lower portion of the joining hole 132 is formed by a groove recessed from the outer circumferential surface of the side plate 13 and the side plate 13 does not penetrate the portion. Since the upper portion of the joining hole 132 is formed by the penetration hole, the joining hole 132 is formed to be opened in the inner circumferential surface of the hollow portion 11, that is, the inner circumferential surface of the main plate 10 forming the hollow portion 11 similarly to the outer circumferential surface of the main plate 10. Fourteen joining holes 132 exist at equal intervals in the circumferential direction of the side plate 13 of the main plate 10.

As illustrated in FIG. 3 and the like, a center protrusion 123 exists in the inner surface of the upper plate 12 of the main plate 10. The center protrusion 123 has a columnar shape and has a coaxial positional relationship with the upper plate 12 having a disk shape (see FIG. 2 and the like). The center protrusion extends downward from the inner surface of the upper plate 12 and is connected by integral molding to the upper plate 12. The attachment hole 121 penetrates the center protrusion 123 and the upper plate 12.

As illustrated in FIG. 4, a partition wall 134 is formed at a position corresponding to the lower end portion (a lower end portion of a melted portion 33A of the inner circumferential surface of the hollow portion 11) of the melted portion 33A (see FIG. 3) formed by melting a boss 33 to be described later by thermal caulking in the inner circumferential surface of the side plate 13 of the main plate 10 to be thermally caulked. The partition wall 134 has a cylindrical shape and has a coaxial positional relationship with the center protrusion 123. The partition wall is connected by integral molding to the side plate 13. The outer diameter and the inner diameter of the partition wall 134 are larger than the outer diameter of the center protrusion 123 and the partition wall 134 is disposed to surround the center protrusion 123.

The partition wall 134 has such a height that the partition wall 134 does not come into contact with the heat chip 51 and the melted portion 33A does not outflow between the partition wall 134 and the side plate 13 of the main plate 10 when the heat chip 51 comes into contact with the boss 33 in the thermal caulking to be described later. The partition wall 134 stops the downward flow of the melted portion 33A formed by melting the boss 33 by thermal caulking beyond the partition wall 134.

Figure 8:
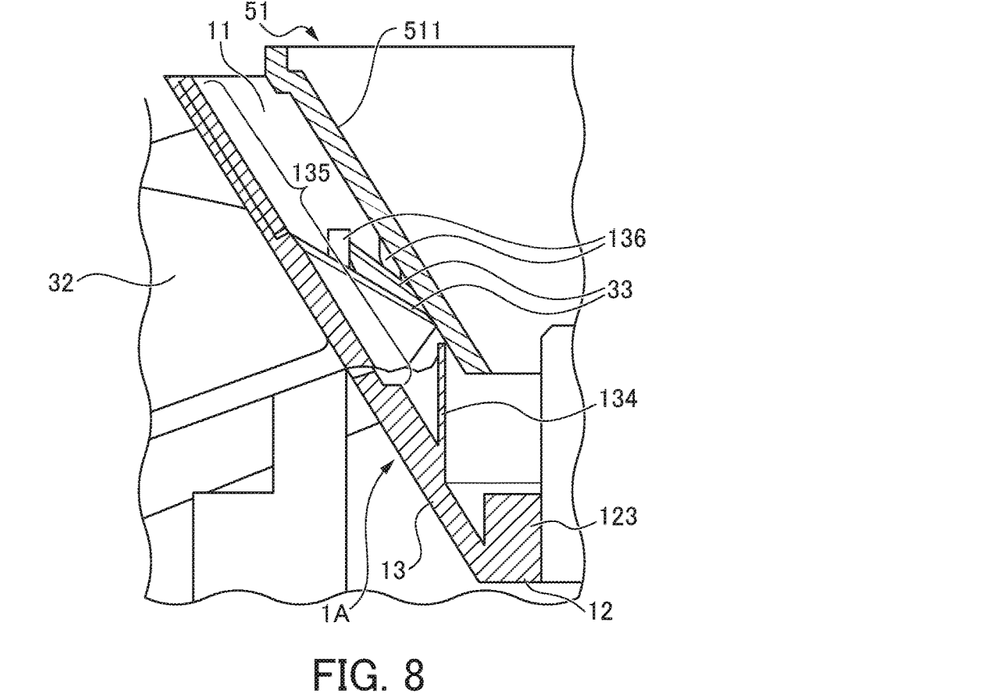
FIG. 8 is a cross-sectional view illustrating a state in which the heat chip 51 starts to melt a boss 33 in the thermal caulking method according to the first embodiment of the invention.

As illustrated in FIGS. 4 and 8, the side plate 13 of the main plate 10 includes an inner circumference enlarged portion 135. The inner circumference enlarged portion 135 is formed by a portion of the side plate 13 in which the inner circumferential surface of the side plate 13 is thin and exists, as illustrated in FIG. 8, from a portion of the side plate 13 between the lower end of the partition wall 134 (the upper end of the partition wall 134 illustrated in FIG. 8) and a portion of the side plate 13 connected to the partition wall 134 in the up and down direction to the lower end portion of the main plate 10 (the upper end portion of the main plate 10 illustrated in FIG. 8). The inner diameter of the side plate 13 is enlarged for a step at the upper end of the inner circumference enlarged portion 135 (the lower end portion of the inner circumference enlarged portion 135 illustrated in FIG. 8). Accordingly, a predetermined gap is secured between the inner circumferential surface of the inner circumference enlarged portion 135 and the outer circumferential surface of the heat chip 51 to be described at the time of performing thermal caulking to be described and thus a predetermined amount of the melted portion 33A formed by the melted boss 33 can be held therein.

Further, as illustrated in FIG. 4 and the like, adjustment protrusion portions 136 are formed in the inner circumferential surface of the side plate 13 in a state before thermal caulking and in the vicinity of the joining hole 132 in the circumferential direction of the side plate 13. Each of the adjustment protrusion portions 136 is formed to correspond to each joining hole 132 and is provided to supply resin by an amount necessary for joining the blade member 30 to the main plate 10. The melted bosses 33 are melted by thermal caulking and are integrated to become the melted portion 33A.

As illustrated in FIG. 5, the second member includes the blade member 30. The blade member 30 includes a bone portion 31, a blade body 32, and the boss 33. The bone portion 31 has a shape substantially matching the joining hole 132 and is fitted one by one into the joining hole 132. That is, fourteen blade members 30 each having the bone portion 31 are provided as many as the joining holes 132. The lower end portion of the bone portion 31 is connected by integral molding to a portion provided with the lower end portion of the joining hole 132 in the lower end portion of the side plate 13 of the main plate 10. For this reason, as illustrated in FIG. 5, the blade member 30 is rotated about a connection portion 301 of the blade member 30 connected to the lower end portion of the main plate 10 (the blade member 30 is bent about the connection portion 301) from a state in which the bone portion 31 is not fitted to the joining hole 132 and, as illustrated in FIG. 4, the bone portion 31 is fitted to the joining hole 132.

The blade body 32 has a curved plate shape extending from the entire bone portion 31. When viewed from the axial direction of the main plate 10, the blade body 32 is disposed so that the blade body 32 of the blade member 30 disposed adjacent thereto overlaps the blade body as illustrated in FIG. 1 and the like. The boss 33 has a substantially triangular plate shape. The entire bottom side of the boss 33 having a substantially triangular shape is connected by integral molding to the upper portion of the bone portion 31. As illustrated in FIG. 4, the boss 33 is fitted into the joining hole 132 when the bone portion 31 is fitted to the joining hole 132 so that the boss protrudes into the hollow portion 11 from the inner circumferential surface of the side plate 13 of the main plate 10 forming the hollow portion 11. As illustrated in FIG. 3, the bosses 33 of the plurality of blade members 30 are melted at one time by thermal caulking to become the melted portion 33A so that the bosses 33 are integrally connected to the bosses 33 of the adjacent blade members 30 and are joined to the main plate 10. The impeller 1 having the above-described configuration constitutes a so-called mixed flow fan.

Figure 6:
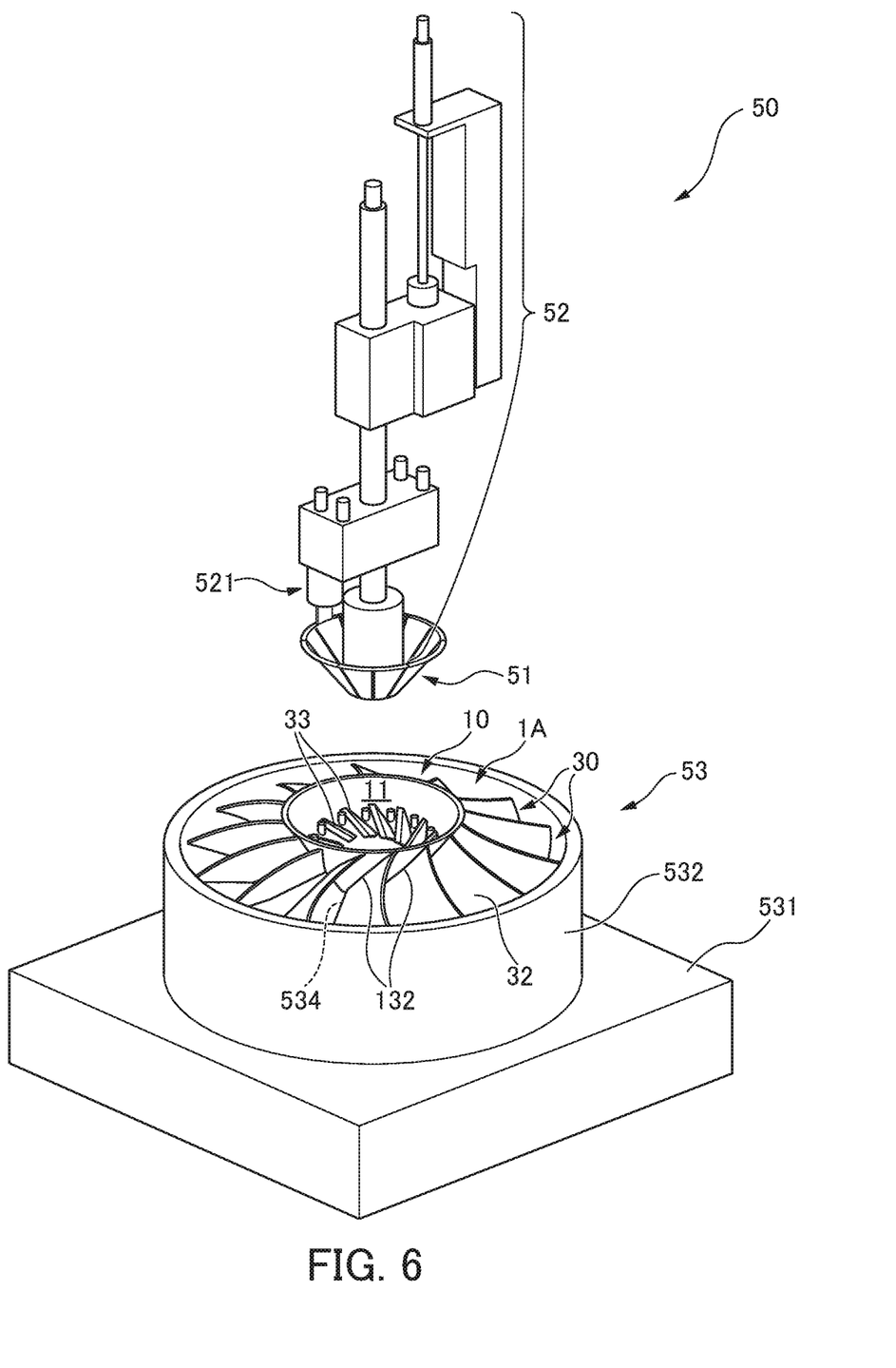
FIG. 6 is a perspective view illustrating a thermal caulking device 50 according to the first embodiment of the invention.
Figure 7:
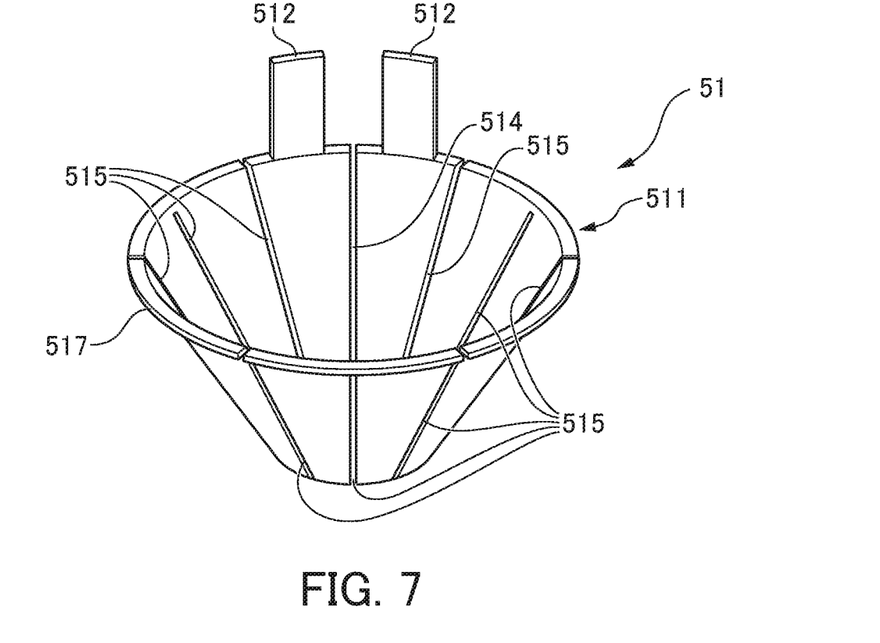
FIG. 7 is a perspective view illustrating a heat chip 51 of the thermal caulking device 50 according to the first embodiment of the invention.

Next, the thermal caulking device 50 will be described. FIG. 6 is a perspective view illustrating the thermal caulking device 50 according to the first embodiment of the invention. FIG. 7 is a perspective view illustrating the heat chip 51 of the thermal caulking device 50 according to the first embodiment of the invention.

As illustrated in FIG. 6, the thermal caulking device 50 includes the heat chip 51, a heat chip driving portion 52, and a holding base 53. As illustrated in FIG. 7, the heat chip 51 includes a heating portion 511 and an electrode portion 512. The outer shape of the heating portion 511 is a shape such that a truncated conical shape is inverted upside down and the upper end portion and the lower end portion of the heating portion 511 are provided with openings. The heating portion 511 which occupies most of the heat chip 51 has a shape continuous in the circumferential direction of the hollow portion 11 along the inner circumferential surface of the side plate 13 of the main plate 10 provided with the hollow portion 11. Here, since slits 514 and 515 to be described later are formed actually, the heating portion 511 does not have a perfect continuous shape, but since the width of the slit is extremely small, it means herein that the heating portion is substantially "continuous". Further, a continuous surface formed by filling an insulation material into the slit may be used. The heating portion 511 is formed of a steel material.

The heating portion 511 is provided with the slits 514 and 515 which allow the outer circumferential surface and the inner circumferential surface of the heating portion 511 to communicate with each other. The slits 514 and 515 divide the heating portion 511 into a plurality of parts in the circumferential direction of the heating portion 511. More specifically, the slit 515 is not formed to completely divide the heating portion 511, but is formed to leave the upper end portion or the lower end portion of the heating portion 511. Thus, an individual part of the heating portion 511 defined by the slit 515 will be hereinafter substantially described as a divided piece.

That is, the plurality of slits are formed, but one slit 514 among them is formed from the upper end portion of the heating portion 511 to the lower end portion of the heating portion 511. Then, the heating portion 511 is divided by one slit 514. However, all of the other slits 515 are not formed from the upper end portion of the heating portion 511 to the lower end portion of the heating portion 511, but the other slits 515 adjacent to the one slit 514 are formed to the upper end portion of the heating portion 511 while leaving the lower end portion of the heating portion 511. Thus, the heating portion 511 is not divided, but is connected at the lower end portion of the heating portion 511 in a portion of the heating portion 511 provided with the other slits 515. Still other slits 515 adjacent to the other slits 515 are formed to the lower end portion of the heating portion 511 while leaving the upper end portion of the heating portion 511. Thus, the heating portion 511 is not divided, but is connected at the upper end portion of the heating portion 511 in a portion of the heating portion 511 provided with the still other slits 515. In this way, the slits 515 are alternately formed. Accordingly, the heating portion 511 is electrically connected so as to circle zigzag in the up and down direction along the circumferential direction of the heating portion 511 from one side of the heating portion 511 toward the other side thereof by using one slit 514 as a boundary.

The upper end portion of the outer circumferential surface of the heating portion 511 is provided with a convex stepped portion 517. The stepped portion 517 protrudes outward in the radial direction of the heating portion 511 from the upper end portion of the outer circumferential surface of the heating portion 511 and continuously extends to circle in the circumferential direction of the upper end portion of the outer circumferential surface of the heating portion 511. Here, since the slits 514 and 515 are formed actually, the stepped portion 517 is not completely continuously formed. However, since the width of the slit is extremely small, it means herein that the stepped portion is substantially "continuous". The stepped portion 517 prevents the melted portion 33A formed by melting the boss 33 by thermal caulking from flowing toward above the heat chip 51 beyond the upper end portion of the heat chip 51.

The electrode portion 512 has a substantially rectangular plate shape. The lower end portion of the electrode portion 512 is connected by integral molding to each of two divided pieces adjacent to one slit 514. The upper end portion of the electrode portion 512 is fixed to each of positive and negative electrodes of the power supply support portion 521 of the heat chip driving portion 52 and is electrically connected thereto. With this configuration, electric power is supplied from the power supply support portion 521 of the heat chip driving portion 52 to the heating portion 511 through the electrode portion 512. Since the heating portion 511 has electric resistance, the entire heating portion 511 generates substantially uniform heat when electric power is supplied to the heating portion 511. Further, the heat chip driving portion 52 is formed so that the power supply support portion 521 is movable in the up and down direction and when the heat chip driving portion 52 drives the power supply support portion 521 in the up and down direction, the heat chip 51 is movable in the up and down direction of FIG. 5.

The holding base 53 includes a base 531 and a cylindrical portion 532 located at an upper portion of the base 531. The cylindrical portion 532 includes a blade body fitting recess 534. The blade body fitting recess 534 has substantially the same shape as the shape of the upper portion of the blade body 32 of the impeller 1 (the lower portion of the blade body 32 illustrated in FIG. 6) and is formed to be recessed downward. Thus, the blade body 32 of the blade member 30 in a state in which the bone portion 31 is fitted to the joining hole 132 of the main plate 10 before thermal caulking is fittable to the blade body fitting recess 534 to have a positional relationship in which the rotation axis direction of the main plate 10 matches the vertical direction. By this fitting, the holding base 53 stably fixes and holds the main plate 10 and the blade member 30 (hereinafter, referred to as a "non-caulked material 1A") upside down while the bone portion 31 is fitted to the joining hole 132 before thermal caulking.

Figure 9:
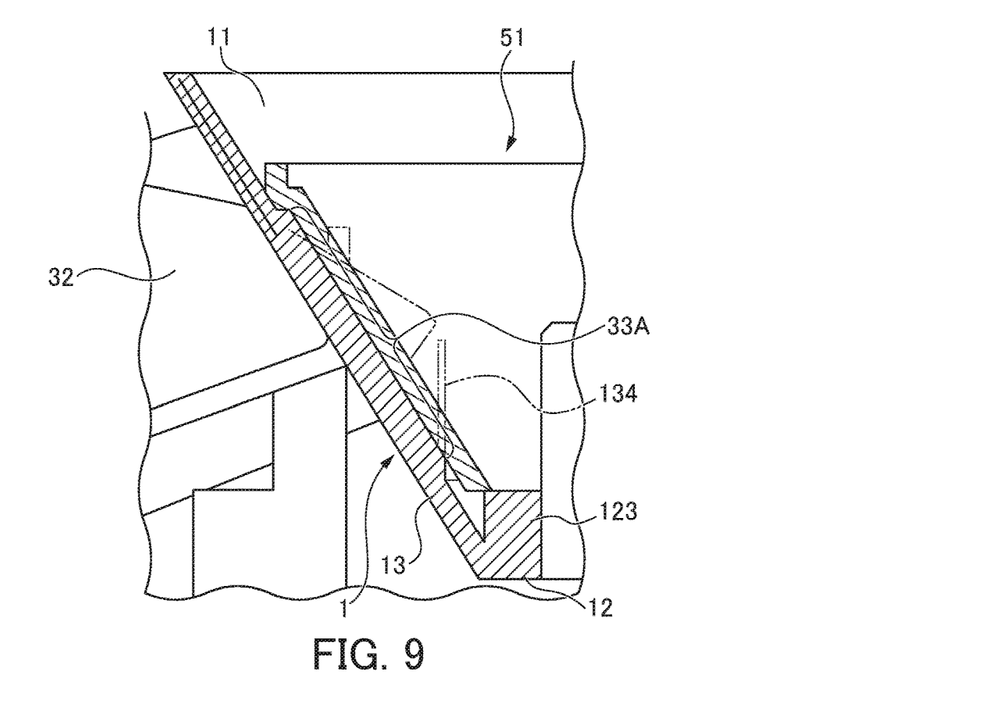
FIG. 9 is a cross-sectional view illustrating a state in which the heat chip 51 has melted the boss 33 and a partition wall 134 in the thermal caulking method according to the first embodiment of the invention.

Next, the thermal caulking method will be described. FIG. 8 is a cross-sectional view illustrating a state in which the heat chip 51 starts to melt the boss 33 in the thermal caulking method according to the first embodiment of the invention. FIG. 9 is a cross-sectional view illustrating a state in which the heat chip 51 melts the boss 33 and the partition wall 134 in the thermal caulking method according to the first embodiment of the invention.

In the thermal caulking method, the blade body 32 of the blade member 30 of the non-caulked material 1A is first fitted to the blade body fitting recess 534 to have a positional relationship in which the rotation axis direction of the main plate 10 of the non-caulked material 1A matches the vertical direction. Accordingly, as illustrated in FIG. 5, the non-caulked material 1A is held by the holding base 53. Next, the heat chip driving portion 52 is driven to move the heat chip 51 downward so that the heat chip 51 is inserted into the hollow portion 11 of the main plate 10.

Then, as illustrated in FIG. 8, the heating portion 511 of the heat chip 51 is brought into contact with the plurality of bosses 33 at one time to melt the adjustment protrusion portion 136 and the plurality of bosses 33 are melted at one time to become the melted portion 33A. At this time, the melted portion 33A flows downward, but the downward flow of the melted portion 33 A beyond the partition wall 134 is prohibited by the partition wall 134 which is not in contact with the heating portion 511 of the heat chip 51 and is not melted. Then, the melted portion 33 A is stored between the partition wall 134 and the side plate 13 of the main plate 10. Accordingly, the resin amount of the melted portion 33A is maintained at a predetermined amount.

Then, the heat chip 51 is moved downward to be brought into contact with the partition wall 134 so that the downward movement of the heat chip 51 is stopped and the partition wall 134 is melted. The partition wall 134 is melted while being deformed to be separated outward in the radial direction from the rotation axis center of the main plate 10. The melted partition wall 134 is integrated with the melted portion 33A so that the resin amount of the melted portion 33A further increases. After the partition wall 134 is sufficiently melted, the melted portion 33A is pressed so that the edge of the lower end portion of the heat chip 51 is located at the same height as that of the inner surface of the center protrusion 123. Accordingly, the partition wall 134 is integrated with the melted portion 33A and the melted portions 33A are connected to each other and mainly disposed in the inner circumference enlarged portion 135. Then, the temperature of the heat chip 51 is dropped to solidify the melted portion 33A. The bosses 33 of the plurality of blade members 30 constituting the melted portion 33A are melted to be integrated and are solidified to be connected so that the bosses are joined to the main plate 10.

According to this embodiment, the following effect is obtained. In this embodiment, in the thermal caulking method, the plurality of bosses 33 of the blade member 30 that is the second member protruding toward the inner circumferential surface of the hollow portion 11 while being fitted to the plurality of holes (the joining holes 132) provided in the inner circumferential surface of the hollow portion 11 of the main plate 10 which is the first member having the substantially conical hollow portion 11 are melted at one time to be joined to the main plate 10 which is the first member. Then, in the thermal caulking method, the plurality of bosses 33 are melted at one time by using the heat chip 51 having a continuous shape in the circumferential direction of the hollow portion 11 along the inner circumferential surface to be joined to the first member while the adjacent melted bosses 33 are connected to each other.

Accordingly, it is possible to melt and connect the adjacent bosses 33 among the plurality of bosses 33 protruding from the inner circumferential surface (the inner circumferential surface forming the hollow portion 11 of the main plate 10) inclined with respect to the axis of the main plate 10 which is the first member and has a positional relationship in which the axis matches the vertical direction by the outer circumferential surface of the heat chip 51 formed by the continuous surface. For this reason, since it is possible to improve the joining strength, it is possible to prevent the blade member 30 having the boss 33 from falling off from the joining hole 132. Further, since it is possible to melt the plurality of bosses 33 at a uniform temperature and a uniform pressure at one time, it is possible to obtain uniform joining strength.

Further, in this embodiment, in the thermal caulking device 50, the bosses 33 of the blade members 30 which are the plurality of second members protruding toward the inner circumferential surface while being fitted to the plurality of holes (the joining holes 132) provided in the inner circumferential surface of the hollow portion 11 of the main plate 10 which is the first member having the substantially conical hollow portion 11 are melted at one time to be joined to the main plate 10 which is the first member. Then, the thermal caulking device 50 includes the heat chip 51 which has a continuous shape in the circumferential direction of the hollow portion 11 along the inner circumferential surface.

Accordingly, since the outer circumferential surface of the heat chip 51 is formed by a continuous surface, it is possible to melt and connect the adjacent bosses 33 among the plurality of bosses 33 protruding from the inner circumferential surface inclined with respect to the axis of the main plate 10 which is the first member and has a positional relation in which the axis matches the vertical direction (the inner circumferential surface of the hollow portion 11 of the main plate 10). For this reason, since it is possible to improve the joining strength, it is possible to prevent the blade member 30 having the boss 33 from falling off from the joining hole 132. Further, since it possible to melt the plurality of bosses 33 at a uniform temperature and a uniform pressure at one time, it is possible to obtain uniform joining strength.

Further, since the heat chip 51 has a continuous shape in the circumferential direction of the hollow portion 11, it is possible to obtain a uniform pressure applied to the melting point of the boss 33 in the plurality of bosses 33 arranged on the inclined surface such as the inner circumferential surface of the substantially conical hollow portion 11 and to reliably press the plurality of bosses 33. As a result, it is possible to thermally caulk the plurality of bosses 33 disposed on the inclined surface at the same time.

Then, the upper end portion of the heat chip 51 is provided with a convex stepped portion 517 which prevents the melted portion 33A formed by melting the boss 33 from flowing toward above the heat chip 51 and is formed to be continuous in the circumferential direction of the upper end portion of the heat chip 51.

Accordingly, it is possible to suppress the melted portion 33A formed by melting the boss 33 from flowing toward above the heat chip 51 and to store the melted portion 33A between the outer circumferential surface of the heating portion 511 of the heat chip 51 and the inner circumferential surface of the main plate 10. Accordingly, it is possible to secure the melted portion 33A formed by a sufficient amount of resin for connecting the adjacent bosses 33 to each other. That is, it is possible to secure the melted portion 33A having a height in the axial direction of the substantially conical hollow portion 11 and a thickness in the radial direction of the hollow portion 11 and to reliably maintain the joining strength.

Further, in this embodiment, the caulked material includes the first member having the substantially conical hollow portion 11 and the plurality of bosses 33 of the second members protruding toward the inner circumferential surface while being fitted into the plurality of holes (the joining holes 132) provided in the inner circumferential surface of the hollow portion 11 of the first member and melted at one time to be joined to the first member. The melted portions 33A formed by melting the plurality of bosses 33 are connected to each other.

Accordingly, since the melted portions 33A formed by melting the adjacent bosses 33 are connected to each other, it is possible to obtain the uniform joining strength of the blade member 30 with respect to the main plate 10 on the whole. Further, since it is possible to improve the joining strength of the blade member 30 with respect to the main plate 10, it is possible to prevent the blade member 30 having the boss 33 from falling off from the joining hole 132.

Then, the partition wall 134 for stopping the flow of the melted portion 33A is formed at a portion of the main plate 10 which is the first member corresponding to the lower end portion of the melted portion 33A of the inner circumferential surface of the hollow portion 11 of the main plate 10 which is the first member before the boss 33 of the blade member 30 which is the second member is joined to the main plate 10 which is the first member.

Accordingly, since the main plate 10 has a substantially conical shape, resin which is the melted portion 33A formed by melting the boss 33 is about to flow downward. However, since the partition wall 134 for stopping the flow of the resin is provided at the lower end of the melted portion 33A, the resin stays in the melted portion 33A while not flowing downward beyond the partition wall 134. For this reason, since there is a sufficient amount of the melted portion 33A for connecting the adjacent melted portions 33A to each other, strength is maintained. Further, when the heat chip 51 is inserted to the lower end, the partition wall 134 is also melted. Accordingly, the amount (resin amount) of the melted portion 33A increases and thus a connection portion (the melted portion 33A) having higher strength can be formed. Further, since the partition wall 134 extends downward from a portion of the side plate 13 in the vicinity of the upper plate 12 of the main plate 10 (the partition wall extends upward from a portion disposed below the non-caulked material 1A at the time of performing thermal caulking), the melted partition wall 134 can flow to the melted portion 33A formed by melting the boss 33 while not flowing to the upper plate 12 when the partition wall 134 is melted.

Then, the first member is formed by the main plate 10. The second member is formed by the plurality of blade members 30. The caulked material is the impeller 1 including the first member and the second member. Accordingly, it is possible to easily manufacture the impeller 1 having the blade members 30 in which the blade bodies 32 are disposed to overlap each other when the impeller 1 is viewed from the rotation axis direction of the impeller 1 by thermal caulking.

Figure 10:
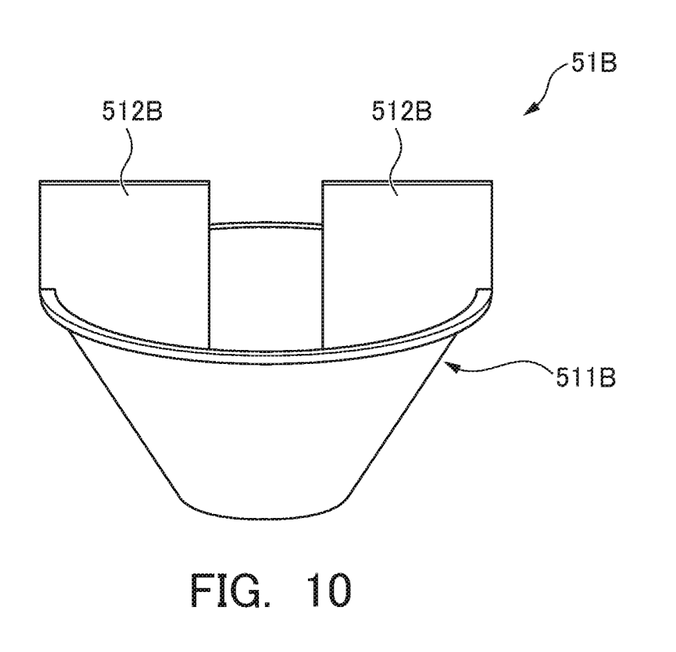
FIG. 10 is a perspective view illustrating a heat chip 51B of a thermal caulking device according to a second embodiment of the invention.

Next, a second embodiment of the invention will be described with reference to the drawings. Hereinafter, the same reference numerals are given to the same components as those of the first embodiment and a detailed description thereof will be omitted. The thermal caulking device according to this embodiment is different from that of the first embodiment in that a heat chip 51B has a different shape. FIG. 10 is a perspective view illustrating the heat chip 51B of a thermal caulking device according to a second embodiment of the invention.

The heat chip 51B includes a heating portion 511B and an electrode portion 512B. As illustrated in FIG. 10, an outer shape of the heating portion 511B is a shape such that a truncated conical shape is inverted upside down similarly to the heating portion 511 of the first embodiment and the upper end portion and the lower end portion of the heating portion 511B are provided with openings.

According to this embodiment, the following effect is obtained. In this embodiment, the slit is not formed. Instead, temperature uniformity is obtained by partially changing the thickness of the chip or adjusting the terminal attachment position. Accordingly, the heat chip 51B can be easily manufactured and the thermal caulking device can be easily manufactured.

The invention is not limited to the above-described embodiment and modifications, improvements, and the like within the scope of achieving the object of the invention are included in the invention. For example, the configurations of the parts of the thermal caulking device are not limited to the configurations of the parts of the thermal caulking device 50 of this embodiment. For example, the shape of the heat chip is not limited to the shape of the heat chip 51 of this embodiment. Likewise, the shapes or configurations of the parts of the caulked material or the non-caulked material are not limited to the shapes of the parts of the non-caulked material 1A or the impeller 1 which is the caulked material of this embodiment. For example, the shape of the stepped portion, the boss, or the partition wall is not limited to the shape of the stepped portion 517, the boss 33, or the partition wall 134 of this embodiment.

Further, the impeller 1 which is the caulked material manufactured by the thermal caulking method using the thermal caulking device 50 is used for blowing air in a fan or the like and constitutes a so-called mixed flow fan, but the invention is not limited thereto. For example, the caulked material may be a so-called sirocco fan having a centrifugal type blade member facing forward or a so-called turbofan having a blade member disposed facing backward.

Further, the main plate 10 has a substantially conical shape, but the invention is not limited thereto. For example, the main plate 10 may have a substantially conical shape, for example, a substantially triangular pyramid shape or the like.

EXPLANATION OF REFERENCE NUMERALS

1 impeller
10 main plate (first member)
11 hollow portion
30 blade member (second member)
33 boss
33A melted portion
51 heat chip
132 joining hole (hole)
134 partition wall
517 stepped portion

The invention claimed is:

1. A thermal caulking method comprising melting, at one time, a plurality of bosses of a second member protruding toward an inner circumferential surface of a conical hollow portion of a first member while being fitted to a plurality of holes provided in the inner circumferential surface of the hollow portion of the first member having the substantially conical hollow portion so that the plurality of bosses are joined to the first member,
wherein the plurality of bosses are melted at one time by using a heating portion having a continuous conical shape in a circumferential direction of the hollow portion along the inner circumferential surface and are joined to the first member while the melted adjacent bosses are connected to each other.

2. A caulked material comprising:
a first member having a substantially conical hollow portion; and
a plurality of bosses of a second member protruding toward an inner circumferential surface of the hollow portion of the first member while being fitted to a plurality of holes provided in the inner circumferential surface of the hollow portion of the first member and melted at one time to be joined to the first member,
wherein melted portions formed by melting the plurality of bosses are connected to each other.

3. The caulked material according to claim 2,
wherein a partition wall for stopping the melted portion is formed at a portion of the first member corresponding to a lower end portion of the melted portion of the inner circumferential surface of the hollow portion of the first member before the second member is joined to the first member.

4. The caulked material according to claim 2,
wherein the first member is formed by a main plate,
wherein the second member is formed by a plurality of blade members, and
wherein the caulked material is an impeller including the first member and the second member.

* * * * *